*(12)* United States Patent
Kurtz

(10) Patent No.: US 7,559,246 B2
(45) Date of Patent: Jul. 14, 2009

(54) SENSOR FOR MEASURING LOW DYNAMIC PRESSURES IN THE PRESENCE OF HIGH STATIC PRESSURES

(75) Inventor: Anthony D. Kurtz, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 79 days.

(21) Appl. No.: 11/521,122

(22) Filed: Sep. 14, 2006

(65) Prior Publication Data

US 2007/0006660 A1    Jan. 11, 2007

Related U.S. Application Data

(63) Continuation of application No. 10/830,796, filed on Apr. 23, 2004, now Pat. No. 7,107,853.

(51) Int. Cl.
  *G01L 7/08* (2006.01)
(52) U.S. Cl. ............................................. 73/715
(58) Field of Classification Search .............. 73/707, 73/721, 715
  See application file for complete search history.

(56) References Cited

U.S. PATENT DOCUMENTS

| | | | |
|---|---|---|---|
| 2,857,742 A | 10/1958 | Druke | |
| 3,188,607 A | 6/1965 | Woodworth | |
| 4,040,172 A | 8/1977 | Kurtz et al. | |
| 4,063,209 A | 12/1977 | Kurtz et al. | |
| 4,137,710 A * | 2/1979 | Preti et al. | 60/223 |
| 4,222,277 A * | 9/1980 | Kurtz et al. | 73/721 |
| 4,287,717 A | 9/1981 | Oldfield et al. | |
| 4,790,192 A * | 12/1988 | Knecht et al. | 73/721 |
| 4,996,886 A * | 3/1991 | Hardin | 73/861.48 |
| 5,955,771 A | 9/1999 | Kurtz et al. | |
| 6,543,293 B1 | 4/2003 | Kurtz et al. | |
| 6,549,293 B2 * | 4/2003 | Hofman | 356/635 |
| 6,588,281 B2 | 7/2003 | Kurtz et al. | |
| 6,595,066 B1 | 7/2003 | Kurtz et al. | |
| 6,642,594 B2 | 11/2003 | Kurtz | |
| 6,688,182 B2 | 2/2004 | Kurtz et al. | |
| 6,742,394 B1 | 6/2004 | Stuttaford et al. | |
| 6,848,319 B2 | 2/2005 | Gleeson et al. | |

* cited by examiner

*Primary Examiner*—Andre J Allen
(74) *Attorney, Agent, or Firm*—The Plevy Law Firm

(57) ABSTRACT

A sensor is described, which basically consists of a leadless high sensitivity differential transducer chip which responds to both static and dynamic pressure. Located on the transducer are two sensors. One sensor has a thicker diaphragm and responds to both static and dynamic pressure to produce an output indicative of essentially static pressure, the static pressure being of a much higher magnitude than dynamic pressure. The other sensor has a thinner diaphragm and has one side or surface responsive to both static and dynamic pressure. The other side of the differential sensor or transducer structure has a long serpentine reference tube coupled to the underneath of the diaphragm. The tube only allows static pressure to be applied on the underside of the diaphragm and because of the natural resonance frequency of the tube, the dynamic pressure is suppressed and does not, in any manner, interface with the sensor or transducer having a thinned diaphragm. Thus, the thinned diaphragm differential unit provides an output which is indicative of the dynamic pressure, as the static pressure applied to both the top and bottom surfaces of the transducer sensor is cancelled.

20 Claims, 1 Drawing Sheet

SENSOR FOR MEASURING LOW DYNAMIC PRESSURES IN THE PRESENCE OF HIGH STATIC PRESSURES

CLAIM FOR PRIORITY

This application is a continuation of U.S. patent application Ser. No. 10/830,796, entitled Pressure Transducer for Measuring Low Dynamic Pressures in the Presence of High Static Pressures, filed Apr. 23, 2004, now U.S. Pat. No. 7,107,853, the entire disclosure of which is hereby incorporated by reference as if being set forth in its entirety herein.

FIELD OF INVENTION

This invention relates to an improved pressure transducer, which enables one to measure low dynamic pressures in the presence of high static pressures.

BACKGROUND OF THE INVENTION

This invention, as indicated above, involves an improved transducer for simultaneous measuring a low dynamic pressure in the presence of a high static pressure. During the testing of jet engines and in many other environments, it is often desirable to measure both the static pressure and the dynamic pressure. The static pressure, in most instances, is usually very high and the dynamic pressure is much lower. The dynamic pressure is also associated with a distinct frequency which occurs at a relatively high rate, for example 5000 cycles or greater. In this manner, the dynamic pressure is usually 20 times less than the static pressure. Hence, to measure static pressure, one requires a transducer with a relatively thick diaphragm so that it can stand the high static pressure. On the other hand, such thick diaphragms have a very poor response to low pressure. Therefore, to measure static pressure and dynamic pressure is extremely difficult unless one uses a thick diaphragm in conjunction with a thin diaphragm. However, if one uses a thin diaphragm, then this diaphragm will rupture upon application of the high static pressure which also contains the dynamic pressure. One can think of the dynamic pressure as a relatively high frequency fluctuation on top of a relatively high constant static pressure. Thus, as one can ascertain, using a thick diaphragm to measure dynamic and static pressure is not a viable solution.

U.S. Pat. No. 6,642,594 entitled, "Single Chip Multiple Range Pressure Transducer Device" which issued on Nov. 4, 2003 to A. D. Kurtz, the inventor herein and is assigned to Kulite Semiconductor Products, Inc., the assignee herein, discloses the problems with transducers responsive to large pressures utilized to measure low pressures. Thus, when you have a pressure transducer adapted to measure relatively large pressures, these transducers suffer from a relatively poor resolution or sensitivity when measuring relatively low pressures. This is because, as a span of the sensor increases, the resolution or sensitivity of that sensor at the low end of the span decreases. An example of various piezoresistive sensors are indicated in that patent. In the patent, there is shown different transducers which have thinned regions having the same thickness, but different planar dimensions. In this manner, the thinned regions will deflect a different amount upon application of a common pressure thereto, whereby when excited each of the circuits provides an output indicative of the common pressure of a different operating range.

As indicated above, during the testing of jet engines there is a very high static pressure which, for example, may be 100 psi. Present with the static pressure is a low dynamic pressure, which may exhibit frequencies in the range of 5000 Hz and above. As indicated, using a high pressure sensor to measure the static pressure will give an extremely poor response to the dynamic pressure because of the small magnitude of dynamic pressure which can be, for example, about 5 psi. Therefore, it is desirable to use a relatively rugged pressure transducer having a thick diaphragm to measure static pressure and to utilize another transducer on the same chip having a thinned diaphragm to measure dynamic pressure. Because the thinned transducer is exposed to static pressure both on the top and bottom sides, the static pressure cancels out and does not, in any manner, afford to cause the thinned diaphragm to deflect. According to the present invention, both static and a dynamic pressure is applied to the rear side of the diaphragm by a reference tube of an exceedingly long length. This reference tube, as will be explained, is a helical structure and has a low resonant frequency. In this manner, when a small dynamic pressure is applied because of the low internal frequency of the tube, the sensor will respond to the static pressure only. As will be explained, the thinned diaphragm should be stopped for pressures in excess of 25 psi, or some higher number than the desired dynamic pressure. As will be explained, the long reference tube can be made by taking a tubular structure and wrapping it such that it looks like a coil or spring. One end would be inserted into the transducer and the other end would be exposed to pressure. In this manner, one can now implement an improved transducer for simultaneously measuring a low dynamic pressure in the presence of a high static pressure.

SUMMARY OF INVENTION

A pressure transducer for simultaneously measuring a low dynamic pressure in the presence of a high static pressure which comprises first and second sensors each having a deflectable diaphragm, which diaphragm deflects according to the magnitude of an applied pressure, and each having at least one pressure sensing element located on the diaphragm and operative to provide an output signal proportional to the applied pressure, the second sensor having a diaphragm that is thinner than the diaphragm of the first sensor, both sensors adapted to receive a static pressure plus a dynamic pressure on a first surface, wherein the first sensor provides an output signal proportional mainly to the static pressure, the second sensor adapted to receive only the static pressure at a surface opposite to the first surface to provide an output proportional mainly to the dynamic pressure.

DETAILED DESCRIPTION OF THE FIGURES

Figure 1:
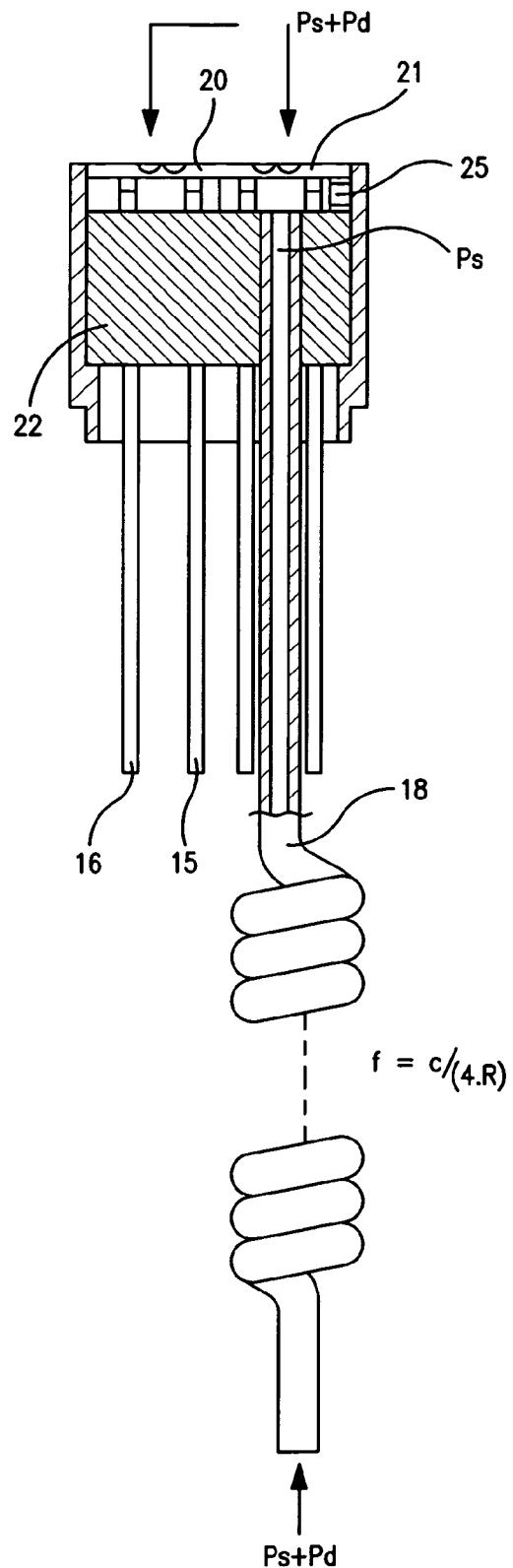
FIG. 1 is the sole FIGURE associated with this invention and depicts a transducer for simultaneous measuring of a low dynamic pressure in the presence of a high static pressure.

Referring to FIG. 1, there is shown a pressure transducer which basically consists of two leadless piezoresistive sensors 20 and 21 mounted on the header pins in accordance with the methods disclosed in Kulite U.S. Pat. No. 5,955,771 entitled, "Sensors for Use in High Vibrational Applications and Methods for Fabricating the Same" which issued on Sep. 21, 1999 to A. D. Kurtz et al., the inventor herein and assigned to Kulite Semiconductor Products, Inc., the assignee herein. This patent is incorporated herein by reference.

The transducer shown in FIG. 1 is also shown in regard to the co-pending application designated as Kulite-66 entitled, "Combined Absolute Differential Transducer", which is U.S. Ser. No. 10/016,035 filed on Dec. 12, 2001. That application is incorporated herein in its entirety and is co-pending with this application.

Shown in FIG. 1 are two separate transducers 20 and 21 which are fabricated by the same process as according to the teachings of the above-noted co-pending application and patent. The difference between the two transducer or sensor structures is that the sensor structure on the left has a diaphragm 20 which is thicker than the diaphragm 21 of the sensor structure on the right. Both sensors receive on their top surfaces a pressure which is Ps+Pd, which is indicative of the static pressure plus the dynamic pressure. As indicated, the static pressure may be of a relatively high value and, for example, could be 100 psi or more. The dynamic pressure appears as a ripple on top of the static pressure and is characterized by a relatively high frequency on the order of magnitude of 5000 Hz and above and a low value of 5 psi or less. Both sensors receive the combination of the static plus the dynamic pressure shown in FIG. 1. Sensor 20, as indicated, has a thicker diaphragm and responds mainly to the static pressure to produce at the output pins (15, 16) associated therewith, a voltage proportional to the static pressure. This voltage would indicate a static pressure of 100 psi or greater, whatever the case may be.

While the output of transducer 20 is also responsive to the dynamic pressure, the dynamic pressure is an extremely small percentage of the total static pressure and may, as indicated, be on the order of 5 psi or less. On the other hand, the thin diaphragm associated with the transducer 21 will respond only to the dynamic pressure, as will be explained. As seen in the FIGURE, transducer 21 has the static plus the dynamic pressure applied to the top surface and is indicated again by Ps+Pd. Coupled to the bottom surface of the diaphragm is a tube or reference tube of an exceedingly long length, designated by reference numeral 18. The tube 18 is coupled to the bottom surface of the diaphragm. Essentially, the tube 18 receives at an inlet both the static and dynamic pressure, which is Ps+Pd.

The tube, as shown, is in helical form. It is well known that the resonant frequency f of such a tube, as, for example, an organ pipe, is given by $f=c/(4l)$ where c is the speed of sound and l is the length of the tube. For instance, in air, where the speed of sound is approximately 1200 feet per second, a tube length of 2½ feet will give a resonant frequency of 120 Hz. Thus, the tube 18 acts as a low pass filter and will only pass frequencies which are below 120 Hz. In this manner, the dynamic frequency, which is 5000 Hz or greater, will not pass through the tube 18. Therefore, the underside of the diaphragm associated with transducer 21 only receives the static pressure Ps. The static pressure is, of course, subtracted from the static pressure plus the dynamic pressure supplied to the top surface of the diaphragm and hence, the output of the differential unit 21 provides a pressure equal to Pd, which is the dynamic pressure. As seen, there is a stop member associated with diaphragm 21. The stop member 25 assures that the diaphragm 21 will not deflect in a downward direction for pressures in excess of 25 psi, or some number higher than the desired dynamic pressure. The reference tube is fabricated by taking a tubular structure, which may be metal or some other material, and wrapping it such that it looks like a coil or a spring where one end is inserted into the transducer, as shown, and the other end is exposed to the static and dynamic pressure. Reference is made to U.S. Pat. No. 6,642,594 entitled, "Single Chip Multiple Range Pressure Transducer Device" issued on Nov. 4, 2003 to A. D. Kurtz, the inventor herein and assigned to the assignee herein.

Therefore, the diaphragm associated with sensor 20 is intended for accurately measuring static pressure. The sensor unit 21 will measure dynamic pressure because of the differential operation of the sensor 21 and because of the tube. These dynamic pressures have relatively high frequencies measured primarily by the first assembly 21, with the second assembly 20 measuring the steady state pressure, which is a large pressure. The fabrication of stops, such as 25 for transducers, is well known in the art. See, for example, U.S. Pat. No. 4,040,172 entitled, "Method of Manufacturing Integral Transducer Assemblies Employing Built-In Pressure Limiting" issued on Aug. 9, 1997 to A. D. Kurtz et al. and is assigned to the assignee herein. See also U.S. Pat. No. 4,063,209 entitled, "Integral Transducer Assemblies Employing Built-In Pressure Limiting" issued on Dec. 13, 1997 to A. D. Kurtz et al. and assigned to the assignee herein.

See also U.S. Pat. No. 6,595,066 issued on Jul. 22, 2003 to A. D. Kurtz et al. and is assigned to the assignee herein and entitled, "Stopped Leadless Differential Sensor". This patent describes a leadless device which is similar to the devices utilized in FIG. 1 which has a stop apparatus associated therewith. The sensor depicted in the '066 patent also operates as a differential sensor with a Wheatstone bridge sensor array. The output provides a difference between a pressure applied to the top side of the sensor with respect to the force applied to the bottom side of the sensor. This sensor acts as the sensor 21 associated and seen in FIG. 1.

See also U.S. Pat. No. 6,588,281 issued on Jul. 8, 2003 entitled, "Double Stop Structure for a Pressure Transducer" issued to A. D. Kurtz et al. and is assigned to the assignee herein. That patent shows a stop device in both first and second directions. As one can ascertain from FIG. 1, a stop 25 is only required in the down direction. This is so, as the large pressure Ps+Pd, as applied to the top surface, could rupture the thin diaphragm if the pressure applied to the bottom surface momentarily is interrupted. In this manner, the diaphragm of the sensor 21 will impinge upon the stop 25 to prevent the fracture of the diaphragm. The interruption of the pressure applied to the bottom surface of the diaphragm could occur during pressure build-up or when the pressure source is first turned on or off.

What is claimed is:

1. A sensor for measuring low dynamic pressure in the presence of high static pressure comprising:

a diaphragm having first and second oppositely disposed surfaces, said diaphragm deflecting according to the magnitude of an applied pressure comprising a low dynamic pressure in the presence of a high static pressure, wherein said first surface receives said applied pressure;

at least one pressure sensing element located on said diaphragm and operative to provide an output signal substantially proportional to said applied pressure; and a tube member having length L and an inlet and an outlet, said outlet of said tube member opening to said second surface of said diaphragm, and said inlet of said tube member receiving said low dynamic pressure as well as said high static pressure, wherein said tube member filters out said low dynamic pressure with frequencies above the resonant frequency of said tube, while allowing said high static pressure to pass through to said second surface, wherein said sensor provides an output substantially proportional to said low dynamic pressure.

2. The sensor according to claim 1, wherein the resonant frequency of said tube is given by $f=c/(4L)$, where c is speed of sound and L is length of said tube.

3. The sensor according to claim 1, wherein said tube has a resonant frequency less than a frequency associated with said low dynamic pressure.

4. The sensor according to claim 1, wherein said tube comprises a coiled tube.

5. The sensor according to claim 3, wherein said resonant frequency is about 120 Hz.

6. The sensor according to claim 3, wherein said frequency of said low dynamic pressure is about 5000 Hz or greater.

7. The sensor according to claim 1, wherein said sensor is a semiconductor sensor and said pressure sensing element is a piezoresistive element.

8. The sensor according to claim 1, further comprising a stop member operative to stop deflection of said diaphragm for a predetermined force applied to said first surface.

9. The sensor according to claim 7, wherein said semiconductor is silicon.

10. A pressure transducer for measuring an applied pressure having a low dynamic pressure in the presence of a high static pressure, comprising:
   a housing;
   first and second sensors in said housing;
   wherein said first sensor comprises:
      a first diaphragm receiving said applied pressure, said first diaphragm deflecting substantially proportional to said high static pressure of said applied pressure; and
      a first pressure sensing element located on said first diaphragm and operative to provide a first output signal substantially proportional to said first diaphragm deflection;
   wherein said second sensor comprises:
      a second diaphragm having first and second oppositely disposed surfaces; and
      a second pressure sensing element located on said second diaphragm; wherein said second diaphragm of said second sensor is thinner than said first diaphragm of said first sensor; and
   a tube having a length L and extending from said housing, said tube having an outlet end opening to said second surface of the second sensor and having an inlet end receiving said applied pressure;
   wherein said tube attenuates the low dynamic pressure as a function of its length L, and passes only said high static pressure of said applied pressure to said outlet end of said tube;
   wherein said second diaphragm of said second sensor receives on said first surface said applied pressure and receives on said second surface only said high static pressure of said applied pressure from said outlet of said tube member;
   wherein said second diaphragm of said second sensor deflects substantially proportional to said low dynamic pressure of said applied pressure;
   wherein said second pressure sensing element on said second diaphragm of said second sensor is operative to provide a second output signal substantially proportional to said second diaphragm deflection.

11. The pressure transducer according to claim 10, wherein the resonant frequency of said tube is function of said length L and is given by $f=c/(4L)$, where c is the speed of sound.

12. The pressure transducer according to claim 11, wherein said resonant frequency of said tube is less than a frequency associated with said low dynamic pressure.

13. The pressure transducer according to claim 10, wherein said tube comprises a coiled tube.

14. The pressure transducer according to claim 12, wherein said resonant frequency is about 120 Hz.

15. The pressure transducer according to claim 12, wherein the frequency of said dynamic pressure is about 5000 Hz or greater.

16. The pressure transducer according to claim 11, wherein said first and second sensors are semiconductor sensors and said pressure sensing element is a piezoresistive element.

17. The pressure transducer according to claim 11, wherein said first and second sensors are formed on a common semiconductor wafer.

18. The pressure transducer according to claim 11 further comprising: a stop member associated with said second sensor and operative to stop deflection of said thin diaphragm for a predetermined force applied to said first surface.

19. Apparatus for suppressing high frequency low dynamic pressure, said apparatus operative in a pressure transducer that measures an applied pressure having a high static pressure and a high frequency low dynamic pressure, comprising:
   a tube member having a length L and a resonant frequency given by $f=c/(4L)$, where c is the speed of sound, wherein said tube member receives both high static pressure and low dynamic pressure of said applied pressure at its inlet end, and wherein said tube member attenuates said high frequency low dynamic pressure, which said high frequency is higher than said resonant frequency of said tube member, and provides at an outlet end only high static pressure of said applied pressure.

20. The apparatus according to claim 19, wherein said tube member comprises a coiled tube.

* * * * *